P. HELDMANN.
MACHINE FOR GRINDING TOE CAPS AND THE LIKE.
APPLICATION FILED DEC. 27, 1910.

1,060,759.

Patented May 6, 1913.

Witnesses.

Inventor.

UNITED STATES PATENT OFFICE.

PETER HELDMANN, OF FRANKFORT-ON-THE-MAIN, GERMANY, ASSIGNOR TO CORPORATION OF MASCHINENFABRIK MOENUS A. G., OF FRANKFORT-ON-THE-MAIN, GERMANY.

MACHINE FOR GRINDING TOE-CAPS AND THE LIKE.

1,060,759.  Specification of Letters Patent.  Patented May 6, 1913.

Application filed December 27, 1910. Serial No. 599,416.

*To all whom it may concern:*

Be it known that I, PETER HELDMANN, engineer, a subject of the German Emperor, and resident of Frankfort-on-the-Main, Germany, with post-office address 92 Moltke Allee, have invented new and useful Improvements in Machines for Grinding Toe-Caps and the Like, of which the following is a specification.

After the toe-caps of boots and shoes have been skived they have to be ground first at one end and then at the other on a grinding machine or the like in order to remove the irregularities left by the skiving operation. The toe-caps have to be guided by hand, which requires skilled and highly paid work. Apart from this the output is very small and the toe-caps are not sufficiently uniform.

The present invention relates to a machine which automatically grinds very completely the toe-caps at both ends simultaneously.

Figure 2:
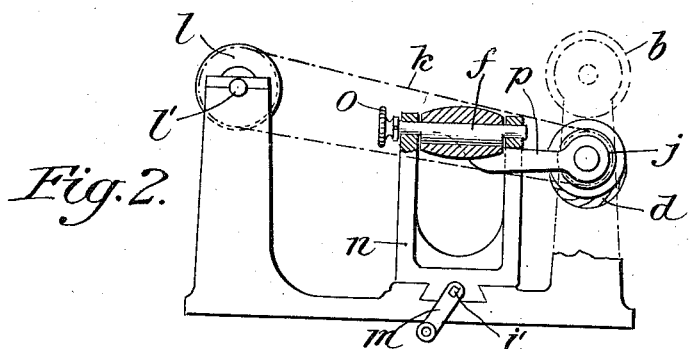
Figure 1:
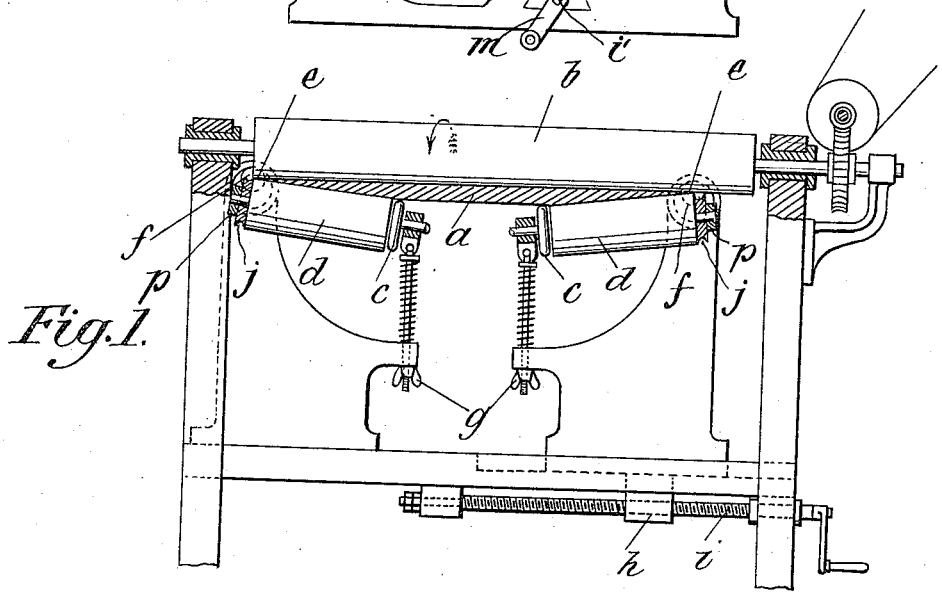
Figure 3:
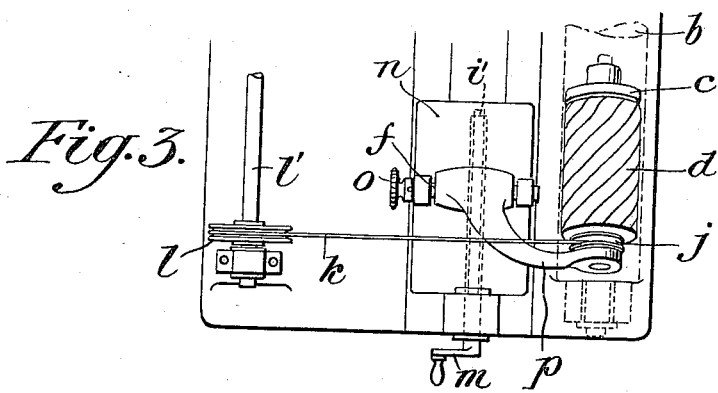

In the accompanying drawing, Figure 1 is a fragmentary vertical longitudinal section of a machine embodying my improvements, Fig. 2 is a side elevation of the machine, certain parts being broken away and other parts being shown in section, and, Fig. 3 is a top plan view of a portion of the machine, showing the parts illustrated in Fig. 2.

The skived toe-cap $a$ (Fig. 1) is inserted between a counter roller $b$ and guide rollers $c$ which bear against the toe-cap with yielding pressure. On the axles of the guide rollers are mounted grinding rollers $d$ having roughened surfaces, and these are rapidly rotated.

The grinding rollers and the guide rollers $c$ can turn about axes $e$ which are tangent to the highest points of the outer edges of the grinding rollers, and are adjustable in the plane that bisects both them and the counter roller $b$. The distance between the said axis to the grinding roller $d$ and the counter roller $b$ is adjusted by rotating the eccentric shaft $f$. By the nuts $g$ the distance of the guide rollers $c$ from the counter roller $b$ can be adjusted.

In order to accommodate toe-caps of different lengths the grinding rollers are mounted so that the distance between them can be adjusted, such as by a screw $i$ and nut $h$. The grinding rollers $d$ are preferably driven by the means shown in Figs. 2 and 3, each roller having a pulley $j$ at one end rotated by a cord $k$ passing over the same and over a driving pulley $l$ on a driving shaft $l'$. The working surface of the grinding roller may be roughened as shown in Fig. 3, or in any other suitable way. The connection between the eccentric shaft $f$ and its corresponding grinding roller is preferably made by means of an arm $p$ connected with the end of the grinding roller, as shown in Figs. 2 and 3, and having a sleeve portion embracing the eccentric shaft $f$, which can be manually rotated by means of the milled knob $o$. The shaft $f$ is preferably mounted on a carriage $n$ adjustable longitudinally of the machine by means of a screw spindle $i'$ operating in the bed of the machine and adapted to be manually rotated by means of the crank $m$.

It will be readily understood that the end of the roller $d$ will be raised or lowered in accordance with the adjustment of the eccentric shaft $f$, the eccentric portion of which pushes the arm $p$ upward or downward as the case may be. In this way the outer end of the grinding roller to wit, the end adjacent the end of the machine, may be adjusted toward and away from the corresponding end portion of the counter roller $b$. The inclination of the grinding roller may also be regulated by the adjustment of its bolt, surrounded by a spring which urges upward the inner end of the grinding roller and holds it in the desired contact with the toe-cap to be operated upon. The proper adjustment can be easily obtained by adjustment of the nut $g$ whereby the grinding roller may be supported to yield to the desired degree and therefore accommodate itself to surface irregularities of the toe-cap or other piece of material being acted upon. The adjustment of the grinding roller afforded by the provision of the eccentric shaft $f$ is primarily intended to adapt the machine to the thickness of the leather which is to be operated on.

Now what I claim and desire to secure by Letters Patent is the following:

1. In a machine for grinding skived toe-caps and the like, the combination of a counter roller, and grinding-rollers inclined to the counter roller adjacent the respective ends of the latter and having cylindrical grinding surfaces by which both ends of the toe-cap or other piece of material are simultaneously ground.

2. In a machine such as described, the combination of a counter roller, and grinding rollers inclined to the counter roller adjacent the respective ends of the latter and having substantially cylindrical grinding surfaces which act simultaneously on the opposite ends of the toe-cap, said grinding rollers being adjustable in inclination, in distance from the counter roller, and in distance from each other.

3. In a machine such as described, the combination of a counter roller, a grinding roller inclined to the counter roller and having one end adjacent the end of the counter roller, and means for moving said end of the grinding roller toward and away from the counter roller.

4. In a machine such as described, the combination of a counter roller, a grinding roller, means yieldingly supporting one end of the grinding roller, and means to move the other end of the grinding roller positively toward and away from the counter roller.

5. In a machine such as described, the combination of a counter roller, a grinding roller, means yieldingly and adjustably supporting one end of said grinding roller, and a device for moving the opposite end of the grinding roller toward and away from the counter roller.

6. In a machine such as described, the combination of a counter roller, a grinding roller to coöperate with the counter roller and inclined with respect thereto, means to support one end of said grinding roller at the desired distance from the counter roller, and an eccentric shaft for adjusting the opposite end of the grinding roller toward and away from said counter roller as said shaft is turned on its axis.

7. In a machine such as described, the combination of a counter roller, a grinding roller, a bolt adjustably supporting one end of the grinding roller and equipped with a spring to urge said grinding roller toward the counter roller, and an eccentric shaft for adjusting the opposite end of the grinding roller with respect to the counter roller.

8. In a machine such as described, the combination of a counter roller, a grinding roller inclined to the counter roller, and means mounting said grinding roller for turning movement about an axis located tangentially of the grinding roller at one end of the same.

9. In a machine such as described, the combination of a counter roller, and a grinding roller in the same plane with the counter roller but inclined with respect to the latter, one end of said grinding roller being located adjacent one end of the counter roller, and said grinding roller being movable about an axis located tangentially of the same at the aforesaid end of said grinding roller.

10. In machines for grinding skived toe-caps and like skived parts of boots and shoes the combination of a counter roller with grinding devices inclined to the counter roller and having one end of each grinding device adjacent the ends of the counter-roller and provided with guides for the toe-caps, at their innermost ends, substantially as and for the purpose described.

11. In a machine such as described, the combination of a counter-roller, a grinding roller, arranged at an inclination to the counter-roller, means to support one end of said grinding roller at the desired distance from the counter-roller, and an eccentric shaft for adjusting the opposite end of the grinding roller toward and away from said counter-roller as said shaft is turned on its axis.

In testimony, that I claim the foregoing as my invention, I have signed my name in presence of two witnesses, this 13th day of December 1910.

PETER HELDMANN.

Witnesses:
 EVA SATTLER,
 ELSE HITZEROTH.

---

Copies of this patent may be obtained for five cents each, by addressing the "Commissioner of Patents, Washington, D. C."